United States Patent [19]
Roberts et al.

[11] Patent Number: 4,507,968
[45] Date of Patent: Apr. 2, 1985

[54] ULTRASOUND VISUALIZATION SYSTEMS

[75] Inventors: Michael K. Roberts, Arvada; Richard A. Ottosen, Denver; Matthew L. McConnell, Boulder, all of Colo.

[73] Assignee: Bion Corporation, Westminster, Colo.

[21] Appl. No.: 481,816

[22] Filed: Apr. 4, 1983

Related U.S. Application Data

[62] Division of Ser. No. 204,589, Nov. 6, 1980, Pat. No. 4,381,675.

[51] Int. Cl.³ .............................................. G01N 29/04
[52] U.S. Cl. ........................................ 73/626; 73/628
[58] Field of Search ................. 73/626, 618, 620, 606, 73/628; 358/11 L; 128/660

[56] References Cited

U.S. PATENT DOCUMENTS

| | | | |
|---|---|---|---|
| 3,651,253 | 3/1972 | Morgand et al. | 358/112 |
| 3,856,985 | 12/1974 | Yukui et al. | 73/620 |
| 3,982,425 | 9/1976 | McLain | 73/63 L |
| 4,058,001 | 11/1977 | Waxman | 73/620 |
| 4,064,741 | 12/1977 | Reynolds | 73/620 |
| 4,068,266 | 1/1978 | Liao | 358/140 |
| 4,099,179 | 7/1978 | Hofstein | 358/140 |
| 4,121,250 | 10/1978 | Huelsman | 358/140 |
| 4,127,034 | 11/1978 | Lederman et al. | 73/626 |
| 4,131,023 | 12/1978 | Mezrich et al. | 73/626 |
| 4,135,139 | 1/1979 | Buchner | 73/626 |
| 4,145,931 | 3/1979 | Tancrell | 73/626 |
| 4,167,753 | 9/1979 | Lynk | 73/611 |
| 4,170,142 | 10/1979 | Posakony et al. | 73/603 |
| 4,201,958 | 5/1980 | Ahamed | 340/367 AD |
| 4,271,842 | 6/1981 | Specht et al. | 128/660 |
| 4,381,675 | 5/1983 | Roberts et al. | 73/620 |

OTHER PUBLICATIONS

"A Companded One-Bit Coder for Television Transmission", R. H. Bosworth et al., *The Bell System Technical Journal*, vol. 48, May-Jun. 1969, pp. 1459-1479.
"Adaptive Delta Modulation with a One-Bit Memory", N. S. Jayant, *The Bell System Technical Journal*, vol. 49, No. 3, Mar. 1970, pp. 321-342.

*Primary Examiner*—Anthony V. Ciarlante
*Attorney, Agent, or Firm*—Woodard, Weikart, Emhardt & Naughton

[57] ABSTRACT

An ultrasound visualization system, and certain aspects of the electronics that are incorporated therein. A scan conversion system which includes means for converting the ultrasound scan signal into a stream of single bit digital data in which each bit is indicative of the relative amplitude of the ultrasound scan signal as compared to the amplitude indicated by previously converted digital data. The single bit digital data is inputted and stored alternately into two full screen buffers. As the data is read into one of the two full screen buffers, the stored data in the other buffer is being simultaneously converted into an analog television video signal. The digital to analog conversion is accomplished by varying an analog television video signal in response to the relative amplitude indicated by each bit in comparison with the amplitude indicated by previously converted digital data. Transceiver or "head" circuitry is also disclosed which includes circuitry that selectively discharges one of an array of transducers which are in parallel, and during the controlled constant current recharge of that transducer, receives and processes the echo signals received by that recharging transducer. Four interlaced sub-arrays are selectively controlled, with each array selectively discharging one transducer in synchronization with the transducers discharged in the other arrays. Selective enable circuitry increments the set of enabled transducers along the array, and is interfaced with a delay decoder that senses shift activations, decodes which of the four sub-arrays is enabling the two central transducers, and delays the pulse applied to those sub-arrays.

6 Claims, 14 Drawing Figures

| SHIFT ENABLE ACTUATED | PULSES DELAYED |
|---|---|
| A | C AND D |
| B | D AND A |
| C | A AND B |
| D | B AND C |

ULTRASOUND VISUALIZATION SYSTEMS

This application is a division, of application Ser. No. 204,589, filed Nov. 6, 1980, now U.S. Pat. No. 4,381,675.

BACKGROUND OF THE INVENTION

1. Field of the Invention:

The present invention relates to improvements in ultrasound visualization systems. More particularly, the present invention relates to improvements in the transceiver or "head" circuitry for selectively switching and driving transducers in a linear phased array format, and further relates to improvements in scan conversion from relatively slow ultrasound scan rate to a scan rate which is suitable for television display in a real time format.

2. Description of the Prior Art:

In recent years ultrasound visualization systems have played an increasingly important role in medical diagnostics. Ultrasound systems present the significant advantages over x-ray systems because they do not involve radiation exposure, and they are capable of detecting subtle changes in soft tissues which are not otherwise distinguishable by x-ray systems. Ultrasound visualization systems also have a number of useful applications in fields other than medical diagnostics.

Ultrasound visualization systems obtain an ultrasound scan signal which is representative of an object being observed by directing accoustical pulses into the object and by processsing the echo signals which are subsequently received. The scan rate of a received ultrasound signal, however, is much slower than the scan rate which would be required for a real time television display. Therefore, a scan conversion system is required to convert the scan rate of the ultrasound scan signal into a signal suitable for a display television. It is known in the prior art to provide the conversion by translating the ultrasound signal into digital data wherein each digital number represents the amplitude for a given point in the scan signal, to store the data in a buffer, and to reconvert the data into a television raster scan signal at a scan rate which is suitable for real time display.

In the communications art, delta modulation has been used in which an analog signal is periodically varied in response to relative changes in a signal to be transmitted. The delta signal is then transmitted and is subsequently decoded by an analog following circuit at the receiving end of the transmission. In this manner, audio and video signals can be transmitted using a relatively narrow band width. In order to be able to reproduce sharp changes in the amplitude signal, and thereby maintain good resolution, various complicated mathematical schemes have been devised. Also, a very high frequency sampling rate must be maintained in order to maintain quality in the received signal.

SUMMARY OF THE INVENTION

The present invention generally relates to ultrasound visualization systems and certain aspects of the electronics that are incorporated in such systems. One such aspect is the scan conversion, in which the received ultrasound scan signal, which is limited to a relatively slow scan rate due to the limiting factor of the speed of sound through tissue (1,540 meters per second) is converted into a television video signal at a scan rate which is suitable for video display in a real time format.

One embodiment of the scan conversion system includes means for converting the ultrasound scan signal into a stream of single bit digital data in which each bit is indicative of the relative amplitude of the ultrasound scan signal as compared to the amplitude indicated by previously converted digital data. The single bit digital data is inputted and stored alternately into two full screen buffers. As the data is read into one of the two full screen buffers, the stored data in the other buffer is being simultaneously converted into an analog television video signal. The digital to analog conversion is accomplished by varying an analog television video signal in response to the relative amplitude indicated by each bit in comparison with the amplitude indicated by previously converted digital data.

Embodiments in the transceiver or "head" circuitry include circuitry which selectively discharges one of an array of transducers which are in parallel, applies a controlled recharge to that transducer, and receives and processes the echo signals through that recharged transducer without interference between that transducer and the other transducers in parallel. Four such arrays are selectively controlled in one embodiment of the present invention, with each array selectively discharging one transducer in synchronization with the transducers discharged in the other arrays. The four arrays, or sub-arrays, are periodically arranged such that for every transducer in each sub-array, the next transducer in that sub-array is the fourth next transducer in the overall array. Shift means sequentially and periodically shifts one of the four enabled transducers to incrementally step the set of enabled transducers along the array. Interfaced with the selective enable circuitry is a delay decoder which senses activations of the shift enables, decodes which of the four sub-arrays is enabling the two central transducers, and delays the pulse applied to those sub-arrays, thereby focusing the acoustical beam transmitted by the four transducers to obtain improved resolution.

It is an object of the present invention to provide circuitry for an ultrasound visualization system which provides advantages of simplicity in design and economy in cost.

It is another object to provide such circuitry which is so compact in size so as to allow convenient portability of the entire ultrasound visualization system. It is a further object to provide such a portable system which can be operated off of a 12 volt battery.

It is a further object to provide such ultrasound visualization circuitry which provides a display resolution of at least the quality as is obtained from the ultrasound scan signal.

These and other objects and advantages will be more apparent from a reading of the following specification.

BRIEF DESCRIPTION OF THE DRAWINGS

FIG. 2 principally shows the scan conversion system, which includes analog to single bit binary converter 60, digital memories 70 and 80, digital memory control 100 and single bit binary to analog converter 90. FIG. 2 also shows main timing 50 which is operated off of oscillator 59.

DESCRIPTION OF THE PREFERRED EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
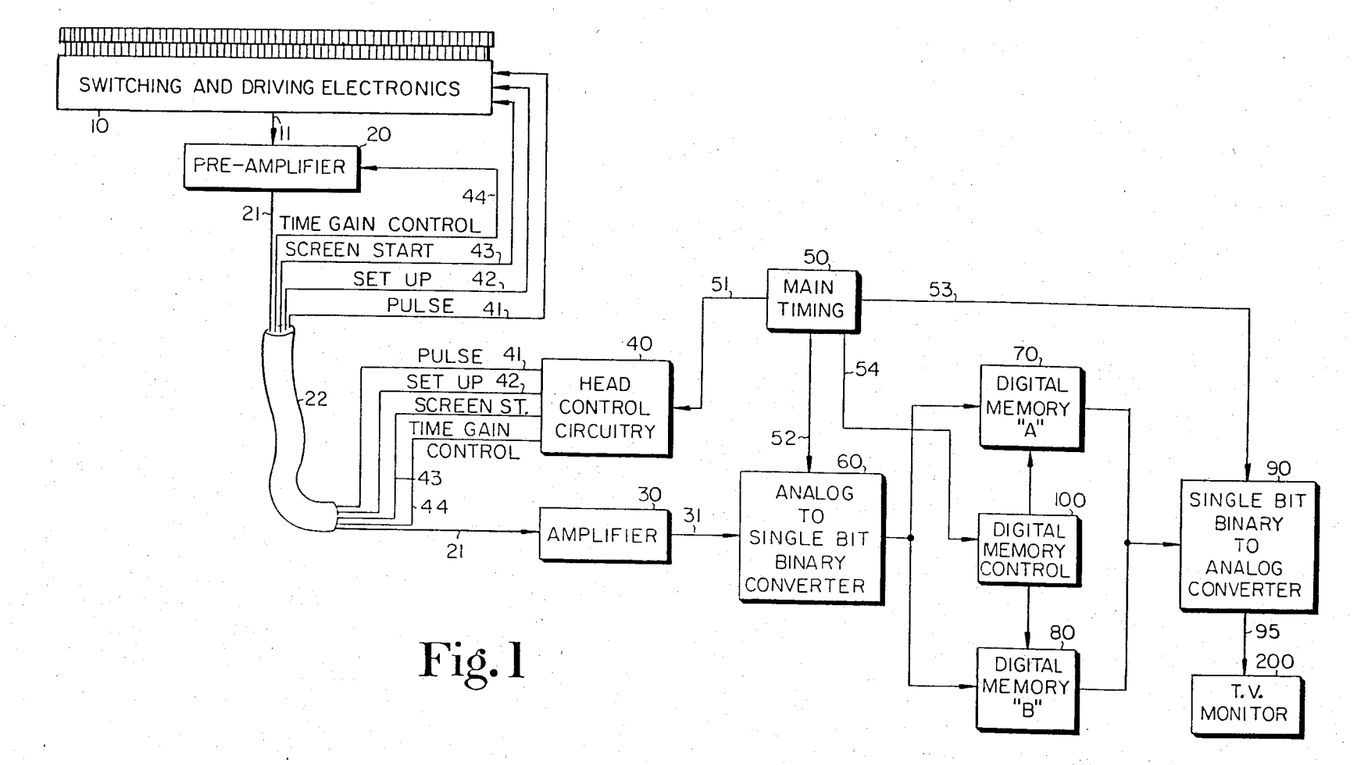
FIG. 1 is a general block diagram of an ultrasound visualization system of the present invention.

Referring now to FIG. 1, which is a block diagram illustrating an ultrasound visualization system of the present invention. The ultrasound visualization system of FIG. 1 can be generally divided into two sections. One section is the transceiver or "head" circuitry which includes switching and driving electronics 10 and preamplifier 20. The switching and driving electronics 10 selectively switches and pulses sequential sets of transducers arranged in a linear array and receives echo pulses therewith. The echo pulses are received through line 11 and amplified by the preamplifier 20. The processed "video" signal is then transmitted by line 21 through flexible cable 22 to the second general section of the ultrasound visualization system.

The second main portion of the system includes a main timing circuitry 50 which controls the timing of the system. Head control circuitry 40 is time controlled by main timing through line 51, and in turn controls various functions in the head circuitry of the system. Head control circuitry 40 controls transmission of the pulse through line 41, controls the initial set up of the scan sequence through line 43 and controls each individual scan initializer through line 42. Head control circuitry 40 also controls the time gain control of preamplifier 20 through line 44. Lines 40-44 extend to switching and driving electronics 10 and preamplifier 20 through flexible cable 22.

Amplifier 30 receives and amplifies the processed "video" signal which has been transmitted by preamplifier 20 through line 21 in flexible cable 22. The amplified signal is then transmitted to analog to single bit binary convertor 60 through line 31. Analog to single bit binary convertor 60 alternately stores the converted stream of single bit binary data into digital memory "A" 70 and digital memory "B" 80. The inputting is alternated once per scan frame and is controlled by digital memory control 100. Analog to single bit binary convertor 60 and digital memory control 100 are time synchronized by main timing 50 through lines 52 and 54 respectively.

Single bit binary to analog convertor 90 is time controlled by main timing 50 through line 53 and alternately reads the digital data stored in digital memory "A" 70 and digital memory "B" 80 (alternating once per scan frame). Single bit binary to analog converter 90 converts this data into a television video signal at a scan rate which is suitable for real time display on a television monitor. This signal is applied to television monitor 200 and displayed in a real time format. The alternating of the output between digital memory "A" 70 and digital memory "B" 80 to single bit binary to analog convertor 90 is controlled by digital memory control 100.

Figure 2:
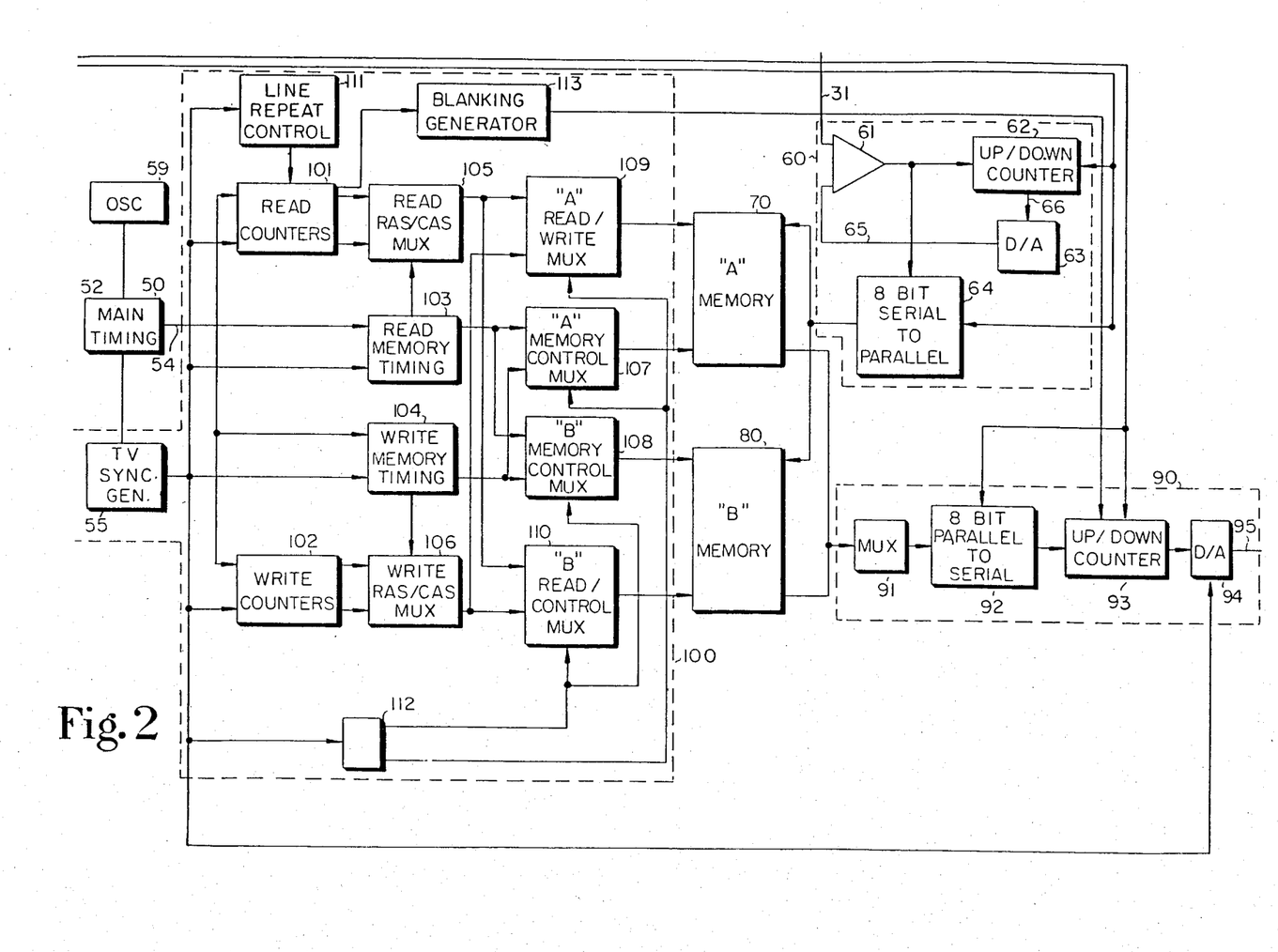
FIG. 2 is more detailed block diagram of various portions of FIG. 1.

FIG. 2 shows the circuitry of analog to single bit binary convertor 60 and single bit binary to analog convertor 90. FIG. 2 also illustrates a detailed block diagram of digital memory control 100, which controls digital memory "A" 70 and digital memory "B" 80.

Analog to single bit binary converter 60 receives an amplified video signal through line 31. The scan rate of the incoming video signal is approximately 4 kHz. This frequency is limited by the speed of sound through the human body, which is 1,540 meters per second. In order to display the ultrasound signal in a real time television format, the scan rate must be converted to approximately 60 Hz.

The incoming signal is applied through line 31 to one of the inputs of comparator 61, where it is compared to one of sixteen discrete levels of analog signal (applied to comparator 61 through line 65). Comparator 61 produces either a logic high or a logic low at its output, depending upon whether the incoming signal is either higher or lower than the compared analog level respectively. Up/down counter 62 is a digital counter which steps up and down between sixteen discrete digital levels in response to the logic high/low output of comparator 61. The cumulative level output of up/down counter 62 is applied to digital to analog convertor 63 through line 66, which in turn applies one of sixteen corresponding analog signals to the comparing input of comparator 61. The sequential single bit digital data thus produced at the output of comparator 61 is received by eight bit serial to parallel convertor 64 and is converted into eight bit parallel words to place the digital data in a suitable format for writing into memories 70 and 80. The frequency of up/down counter 62 and eight bit serial to parallel convertor 64 are determined by the operation of main timing 50 through line 52. By properly selecting the frequency of operation of up/down counters 62 and eight bit serial to parallel convertor 64, the incoming ultrasound scan signal can be accurately converted into a series of single bit digital data. The frequency should preferably be selected so that up/down counter 62 increments and decrements at about the same rate as the maximum slope of the incoming signal. Too slow of a "read" rate will cause the converted data to react too slowly to be representative of the incoming signal. Too fast of a "read" rate will cause feedback loop instability. Where the sampling rate is between $\frac{1}{3}$ and 4/3 of the incoming rate of the signal, a suitable display will be obtained.

The single bit binary to analog convertor 90 includes multiplexer 91, eight bit parallel to serial convertor 92, up/down counter 93 and digital to analog converter 94. The stored digital data in memories 70 and 80 is alternately fed into eight bit parallel to serial convertor 92 through multiplexer 91. The single bit binary data is then fed into up/down counter 93 which increments and decrements between sixteen discrete digital levels. Digital to analog converter 94 varies a standard analog television video signal in response to the output of up/down counter 93. Depending upon which of the sixteen discrete levels indicated by up/down counter 93, digital to analog converter 94 increments or decrements an analog television video signal among sixteen relative amplitudes. This analog television signal is then inputted and displayed on television monitor 200 (through line 95).

Read/write access to memories 70 and 80 are controlled by digital memory control 100. Write counters 102 sequentially step through the scan format of ultrasound scan signal with the sequential stepping corresponding to positions in identical memories 70 and 80. The sequential stepping is time controlled by main timing 50 and by television sync generator 55. Output of write counters 102 is inputted to read RAS/CAS multiplexer which feeds the signals to multiplexers 109 and 110. The timing of multiplexer 106 is controlled by write memory timing 104 and is synchronized to the writing of the incoming ultrasound signal.

Read counters 101 sequentially step through the scan format, with the stepping corresponding to data positions in memories 70 and 80. Timing is controlled by main timing 50 television sync generator 55. The output of read counters 101 is inputted to read RAS/CAS mulitiplexer 105, which feeds the signal to multiplexers 109 and 110. The timing of multiplexer 105 is controlled by read memory timing 103 and is synchronized to a television scan rate.

"A" read/write multiplexer 109 multiplexes the data position sequencing signals from read RAS/CAS multiplexer 105 and write RAS/CAS multiplexer 106, and applies one of the two signals to the "A" memory 70. The application of the signals is alternated by flip flop 112 which is actuated by television sync generator 55.

Likewise, "B" read/control multiplexer 110 multiplexes the data position sequencing signals from read RAS/CAS multiplexer 105 and write RAS/CAS multiplexer 106, and applies one of the two signals to the "B" memory 80. The application of the signals is alternated by flip flop 112 which is actuated by television sync generator 55.

Access control of "A" memory 70 is by "A" memory control multiplexer 107 which multiplexes the timing signals from read memory timing 103 and write memory timing 104. The alternation of the access control to memory 70 is actuated by flip flop 112. Likewise, access control of "B" memory 80 is by "B" memory control multiplexer 108 which multiplexes the timing signals from read memory timing 103 and write memory timing 104. The alternation to "B" memory 80 is actuated by flip flop 112.

A limiting factor in scan conversion from an ultrasound scan signal to a television video signal is the length of time required to obtain a full screen of the incoming ultrasound scan signal. This takes substantially longer than the amount of time for displaying a full screen of television video because of the time restraints caused by the speed of sound through tissue (1,540 mps) and the time necessitated to receive the acoustical reflections from inside the body. By alternating between two buffer memories the mismatch of the scan rates between the ultrasound scan and the television video scan can be easily rectified. Matching the overall scan rates may be accomplished by repeating lines in the television scan, blanking various portions of the television scan (in effect displaying a partial screen), or by rescanning the same data in multiple scans (asynchronous conversion). In FIG. 2 the line repeat function is shown by line repeat control 111 which, according to one embodiment, controls read counters 101 to repeat each line of data three times. Additionally, blanking generator 112, responsive to read counters 101, blanks various portions of the television video screen by blanking up/down counter 93. Asynchronous reading and writing may be easily accomplished in read counters 101 by a wrap around circuit.

Figure 3:
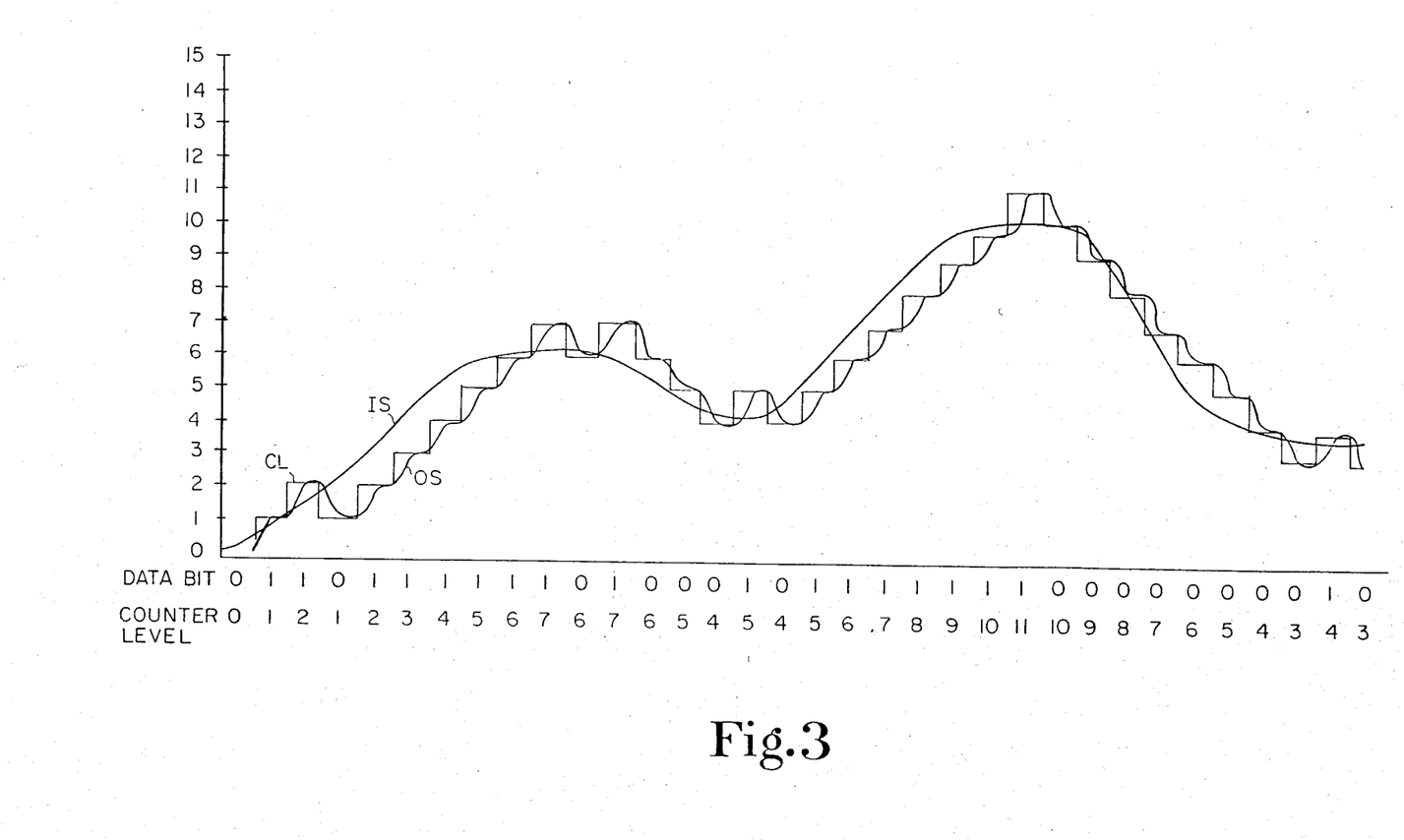
FIG. 3 is a graph which illustrates the manner in which a single bit stream of digital data can collectively approximate an incoming analog signal and can then be reconverted into an analog signal which is representative of the original signal.

FIG. 3 is a graph which illustrates the manner in which a single bit stream of digital data can collectively approximate an incoming analog signal and then can be reconverted into an analog signal which is representative of the original signal. Line IS represents a portion of an incoming ultrasound scan signal. There are sixteen levels of relative amplitude (levels 0–15) indicated on the y-axis of the graph. Incoming analog signal IS is converted into a stream of single bit digital data where each bit is indicative of the relative amplitude of the incoming signal at a point in time as compared to an amplitude indicated by previously converted digital data. This reference amplitude is so indicated by an up/down counter, which maintains the cumulative level indicated by the previously converted single bits. This reference level is indicated in FIG. 3 by the counter level indication given at the bottom of the chart, and by line CL. The output signal OS is reconstructed from the single bit digital data to be representative of input signal IS. This is accomplished by means of an analog follower which varies an analog signal to follow the relative amplitude indications given by the sequence of single bit data. It can be seen from FIG. 3 that the analog follower approximates the new reference amplitude in approximately one-half of the time period represented by each single bit. In this way, output signal OS very nearly approximates input signal IS. The vacillations about the actual signal are not significant enough to be noticeable to the human eye when displayed on a television monitor.

The technique of scan conversion as hereinabove described provides substantial advantages in its simplicity of design and operation, in its compactness, and in its economy in cost. Yet the scan conversion system still provides display resolution of at least the quality that is obtained from the ultrasound scan signal.

Specific advantages are obtained because of the relative simplicity and inexpensiveness of converting from an analog signal to a single binary bit. "Flash" converters, where an analog signal is converted into a multiple bit digital number are much more expensive and are also larger in size. While the data contained in a single bit is obviously less that of full digital representation of the amplitude, the series of single bits for over an entire line can easily be used to reconstruct the original signal. And the preciseness of the signal is maintained within visible tolerances because of the relative slowness of the incoming ultrasound signal. And by only storing single bits of data, there is a savings of 75% or more in the amount of memory which is required.

The system as herein described can easily be constructed in a compact form which fits inside of a small suitcase, and the components can be operated off of a 12 volt source. Thus is provided a system of total portability, with clear benefits in the area of medical diagnostics and in other ultrasound applications.

A limitation of delta modulation in the communacation art is its inability to maintain high quality resolution in light of the high band width, high frequency input, with presently available components. However, single bit data conversion can be operated at an ultrasound scan rate (which is inherantly slower than communication transmission rates), and can produce a television display image which has at least as good resolution as is obtainable from the ultrasound signal (which inherently has a diminished quality of resolution as compared to standard video). Thus is produced a synergistic marriage, wherein the limitations of each concept compensate for the limitations of the other to provide an overall system which is a substantial improvement over the prior art.

The use of single bit data storage also provides savings in terms of memory required. Single bit storage, as opposed to storage of 16 levels of amplitude provides a saving of 75% in required memory.

Figure 4:
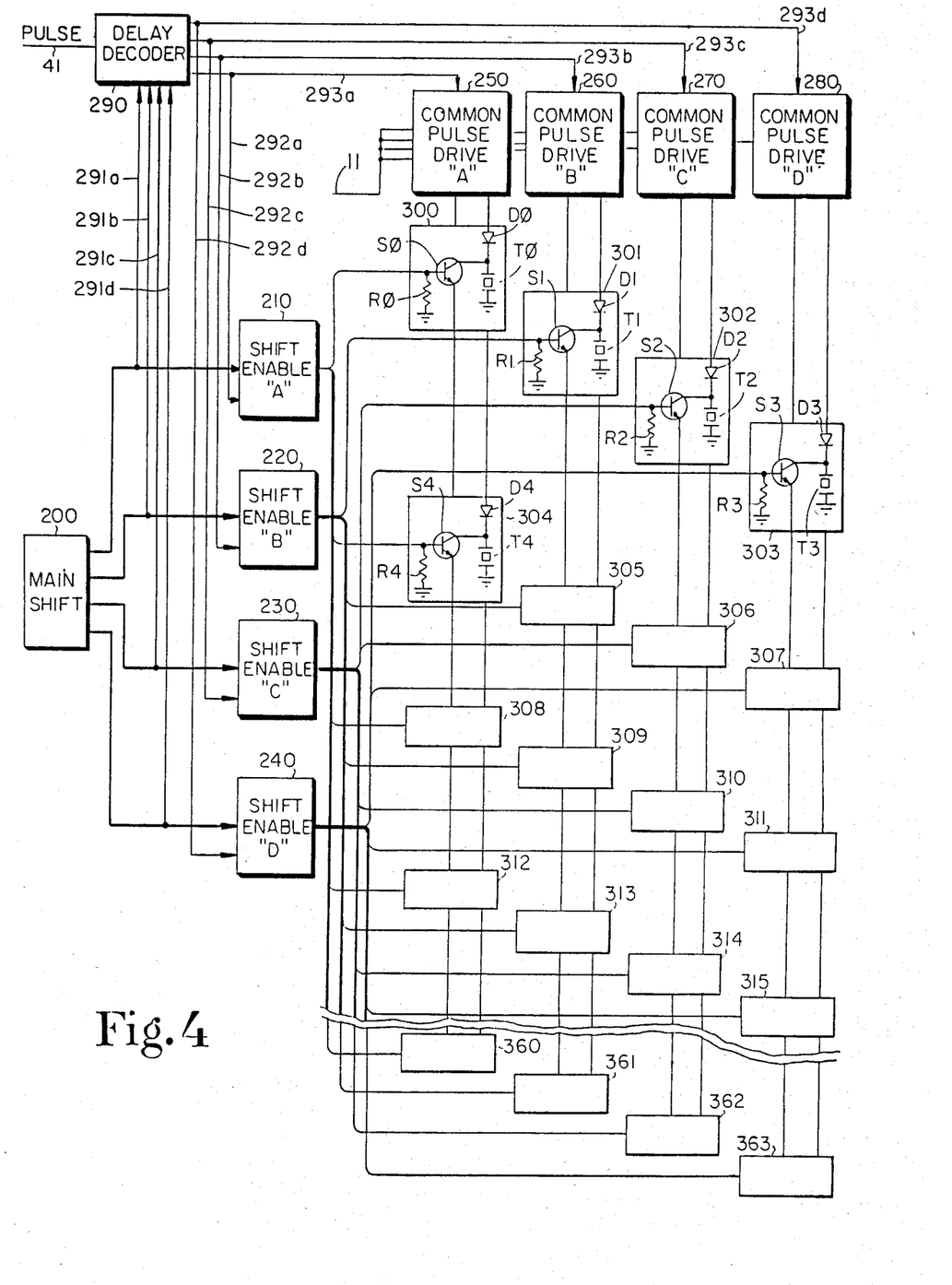
FIG. 4 is a block diagram of the switching and driving electronics 10 of FIG. 1.

FIG. 4 is a block diagram of the switching and driving electronics 10 of FIG. 1. The circuitry described in FIG. 4 selectively and sequentially excites transducers in a linear array of 64 transducers. The immediate circuitry about transducers T0 through T63 is represented by boxes 300-363. The transducers in the array are controlled by the four shift enable means 210, 220, 230 and 240 with every fourth transducer being controlled by a common shift enable. Thus, shift enable "A" 210 connects with transducers T0 (box 300), T4 (box 304), T8 (box 308) . . . and T60 (box 360). Likewise, shift enable "B" 220 connects with each fourth transducer starting with transducer T1 (box 301), and ending with transducer T61 (box 361). Shift enable means "C" 230 connects with each fourth transducer starting with transducer T2 (box 302), and ending with transducer T62 (box 362). And shift enable means "D" 240 connects with each fourth transducer starting with transducer T3 (box 303), and ending with transducer T63 (box 363).

Likewise, common pulse drives 250, 260, 270, and 280 connect with each fourth transducer in the linear array. Common pulse drive "A" 250 corresponds with shift enable "A" 210 and connects with the same transducers. Common pulse drive "B" 260 corresponds with shift enable "B" 220, and connects with the same transducers. Common pulse drive "C" 270 corresponds with shift enable "C" 230, and connects with the same transducers. Common pulse drive "D" 280 corresponds with shift enable "D" 240, and connects with the same transducers.

The interleaving configuration of the array of transducers provides for a very simple sequential stepping of adjacent enable transducers along the array, with one of the enabled transducers belonging to each of the subarrays (corresponding to the four selective enable means). The stepping along the array is generally accomplished by main shift 200, which sequentially enables each of the shift enables 210, 220, 230, and 240 in a periodic format. By way of illustration: initially, transducers T0 (shift enable "A" 210), T1 (shift enable "B" 220), T2 (shift enable "C" 230), and T3 (shift enable "D" 240) are enabled. After the initial excitation of these transducers by common pulse drives 250, 260, 270, and 280, main shift 200 actuates shift enable "A" 210 to shift its enabled transducer from transducer T0 to the next transducer in that subarray (T4). After the shift, the four enabled transducers are T1 (shift enable "B" 220), T2 (shift enable "C" 230), T3 (shift enable "D" 240), and T4 (shift enable "A" 210). After the subsequent excitation of the enabled transducers, main shift 200 actuates shift enable "B" 220 to shift to the next transducer in its subarray (from T1 to T5). With this shift, the enabled transducers are T2 (shift enable "C"), T3 (shift enable "D"), T4 (shift enable "A"), and T5 (shift enable "B"). It can thus be seen that four adjacent enabled transducers can be simply and easily sequentially stepped and pulsed along the linear array.

The general manner in which the stepping of four adjacent transducers along a linear array is accomplished is also illustrated in FIGS. 9a-e. The functional equivalent of shift enables 210, 220, 230, and 240 is illustrated by counter 1, counter 2, counter 3 and counter 4 respectively. The enabled transducers are indicated by solid lines from the counters to the transducers, represented by T0, T1, T2, T3, T4, etc. The dashed lines indicate the transducer which is disenabled by the shifting of the particular counter. FIGS. 9a-e are time sequential, with the initial FIG. 11a showing transducers T0, T1, T2, and T3 enabled. The set of enabled transducer is sequentially stepped along the array until where, in the final diagram (FIG. 9e), the four enabled transducers are T4, T5, T6, and T7.

The interleaved arrangement of the switching and pulsing circuitry for the linear array of transducers produces a substantial advantage in that it allows for a relatively simplified decoding circuit to delay the excitation pulses for the two central transducers for each occurring excitation of four adjacent transducers. Such delay decoding is used to achieve improved resolution. Because four adjacent transducers are simultaneously excited, and because the ultrasound scan signal is arrived at by the acoustic reflections over subsequent time period to that excitation. By delaying the central two of the four excited transducers the acoustic reflections are "time" focused to provide improved resolution. This technique is referred to as Fresnal focusing.

Delay decoder 290 is sensitive to the activation of shift enable means 210, 220, 230, and 240 by main shift 200 (lines 291A-D respectively. Because of the interleaving, it is relatively simple to decode from the information of which shift enable is actuated to determine which of the two shift enable means are enabling the central two transducers for the next subsequent excitation. Delay decoder 290 can thus delay the pulses to those two central transducers, thereby obtaining Fresnel focusing.

Figure 7:
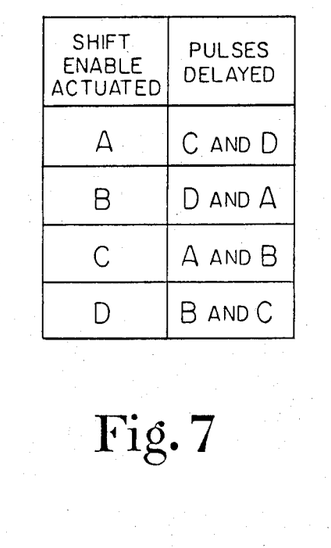
FIG. 7 is a chart showing the decoding scheme for determining pulse delay in delay decoder 290 of FIGS. 4 and 5.
Figure 8A:
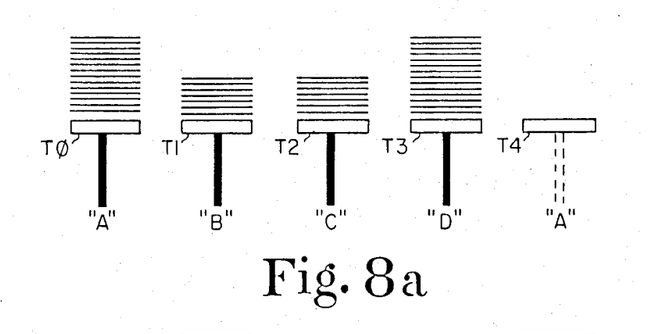
FIG. 8a illustrates the delay pulse transmission which occurs for the initial pulse in a scan.
Figure 8B:
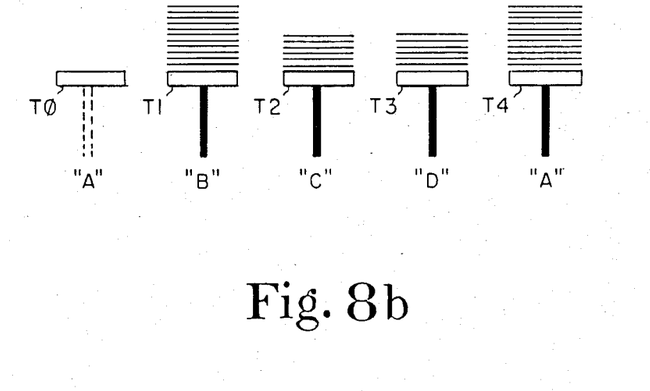
FIG. 8b illustrates the delayed pulse transmission which occurs for transducers T1-T4 in a second, subsequent pulse in the scan.
Figure 9A:
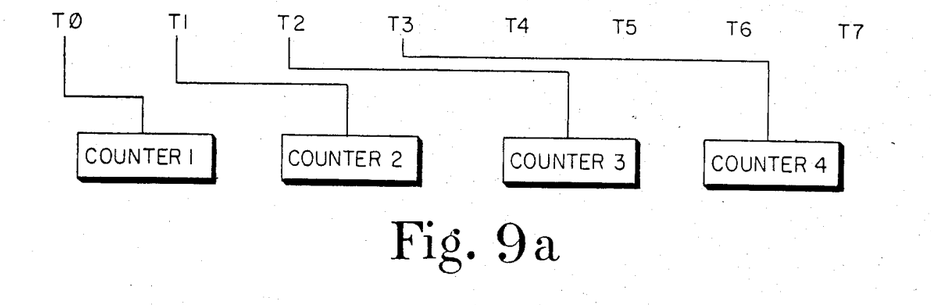
FIGS. 9a-9e illustrates the sequential stepping of a set of enabled transducers along a linear array which occurs through the operation of the circuitry illustrated in FIGS. 4-6.
Figure 9B:
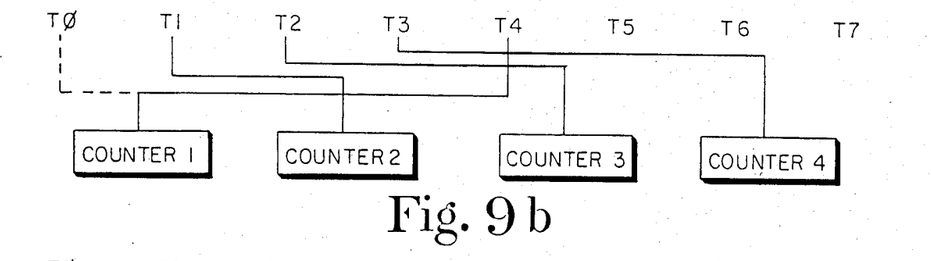
Figure 9C:
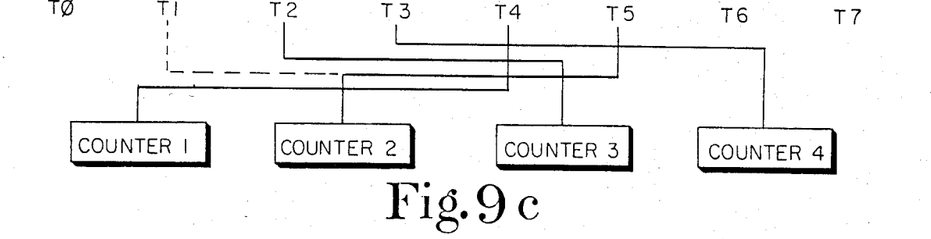
Figure 9D:
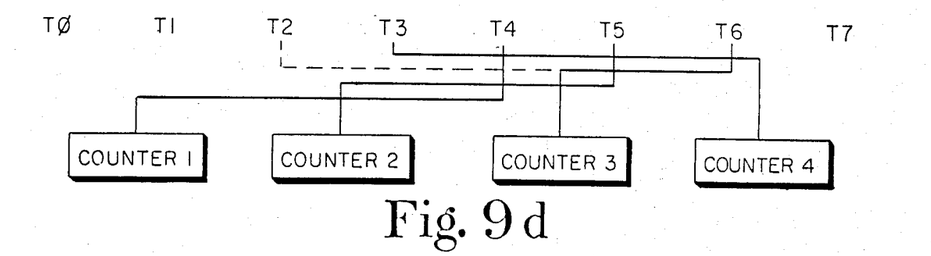
Figure 9E:
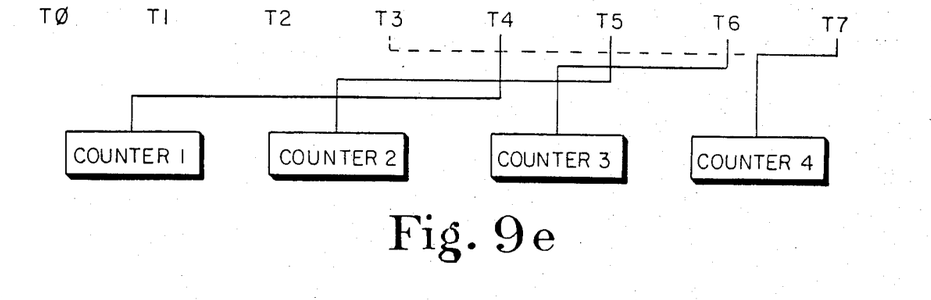

The delay decoding which occurs in delay decoder 290 is illustrated in FIG. 7. Where the shift enable actuated is "A", the two central pulses are "C" and "D", thus those are the two pulses delayed. When the shift enable actuated is "B", the central two transducers are connected to shift enables "D" and "A", and thus those are the two delayed pulses. Likewise, the actuation of "C" delays "A" and "B", and the actuation of "D" delays "B" and "C." FIGS. 8a and 8b illustrate the Fresnal focusing which is obtained by delaying the central two pulses. FIG. 8a shows the initial four transducers being excited. FIG. 8b illustrates the next subsequent excitation where shift enable "A" has been actuated, and where the central two delayed pulses are to "C" and "D."

The actual delay of the excitation of the pulse may be accomplished by either delaying the enabling of the particular shift enable means (lines 292A-D), by delaying the pulse applied to the corresponding pulse drive means (lines 293A-D) or both means. Both means are shown in FIGS. 4 and 5.

Figure 5:
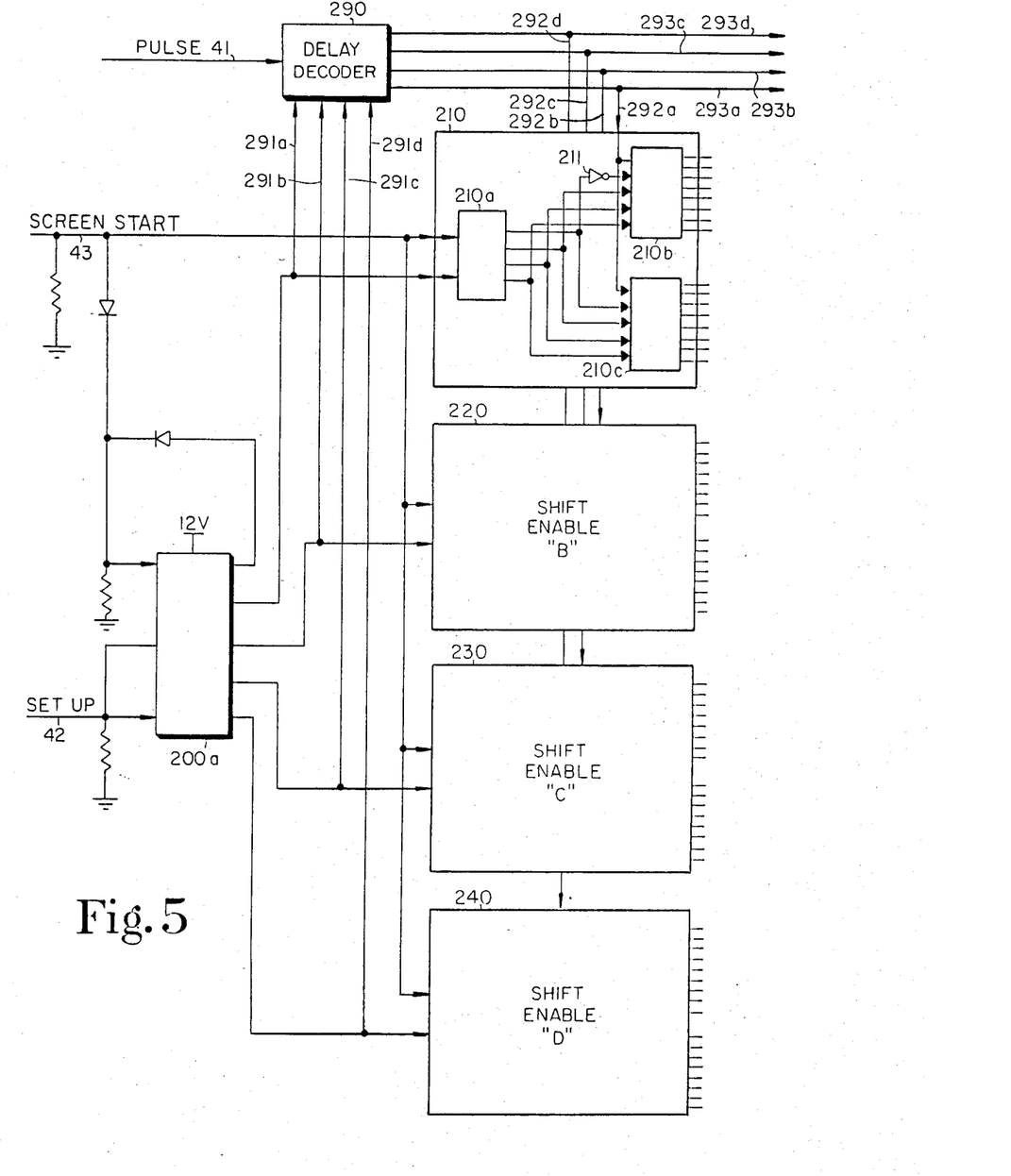
FIG. 5 is a more detailed diagram of the switching circuitry and delay decoding circuitry of FIG. 4.

FIG. 5 is a more detailed diagram of the switching circuitry and delay decoding circuitry of FIG. 4. Main shift 200 is illustrated by integrated circuit chip 200A. A suitable chip for this purpose would be of the model 4022 variety. Chip 200a is responsive to a set of pulses (line 42), which initiate the actuation by chip 200A of shifts in shift enables 210, 220, 230, and 240. The circuitry displayed inside shift enable 210 is illustrative of the circuitry of the other shift enables, and includes counters 210a, 210b, and 210c. For counter 210a, an intergrated circuit of the 4520 variety is suitable. Counters 210b and 210c may be integrated circuit chips of the 4051B family, or any other suitable analog switch chip.

Counter 210a counts between one of sixteen levels, each of these levels sequentially excites one of the sixteen outputs of 210b and 210c. Inverting amplifier 211 shifts the actuation from 210b to 210c (between the eighth and ninth transducers). Counter 210a is initialized to zero at the start of each scan by a pulse through screen start line 43. The application of delayed and undelayed pulses from delay decoder 290 through lines 292A-D is applied to the enable pins of counters 210b and 210c.

Figure 6:
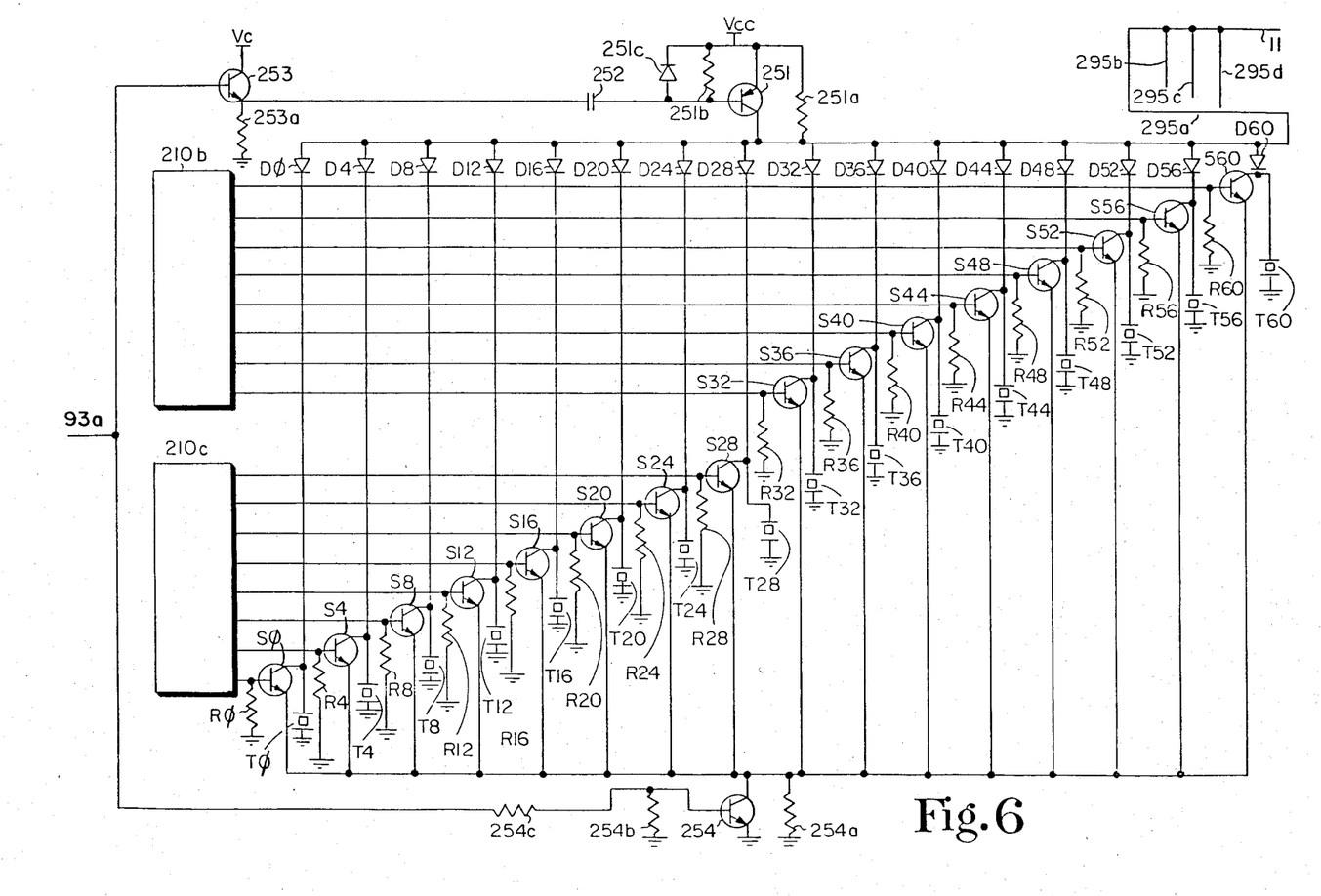
FIG. 6 is a more detailed schematic diagram showing pulsing and driving circuitry for one of the transducer sub-arrays of FIG. 4.

FIG. 6 is a detailed schematic diagram which shows the particular circuitry by which the transducers in one of the subarrays are pulsed. The subarray which is illustrated is the "A" subarray that is controlled by shift enable "A" 210, and common pulse "A" 250. Counters 210b and 210c are illustrated in FIG. 8, which also shows their outputs applied to the bases of enabling transistors S0, S4, S8 and every fourth transistor thereafter up to S60.

The immediate circuitry about each of the transducers in the subarray corresponding to shift enable "A" 210 (T0, T4, T8, ... T60) is also illustrated. The specific circuitry of common pulse drive "A" 250 is shown by components indicated by numerals in the 250's.

The manner of excitation of an individual transducer in the subarray and receiving echo signals therefrom is as follows: intially seventy volts is applied to each of the transducer from voltage source VCC (70 volts) through resistor 251A and through forward biased diodes D0, D4, D8 ... D60. The transducers are in a charged state but are not excited, thus each transducer, owing to its own inherant capacitance, acts as its own energy storage element. Initially, PNP transistor 251 is biased in an off state. The voltage differential is applied to all of the transducers in the array, however each of the transducers is isolated from the other transducers by the forward biased diodes in series with the transducers.

Upon the application of a pulse (line 293a) the particular enabling transistor (S0, S4, ... S60) is turned on, and also transistor 254 is turned on, thereby providing a direct path to ground. By so grounding the particular transducer and removing the applied voltage differential of seventy volts, the transducer is excited to generate an acoustical pulse.

When a pulse is applied (line 293a) transistor 253 is turned on, discharging capacitor 252. The discharging of capacitor 252 turns on transistor 251 which applies a current pulse to recharge the particular excited transducer. A constant current is then maintained through the forward biased diode corresponding to the recharged transducer and through the corresponding enabling transistor to hold the diode in a forward biased state during the time the transducer is receiving echo signals. The received echo signals can thus pass through lines 295a and 11 to preamplifier 20. Similarly, received echo signals from the other three excited transducers for the other three sub-arrays follow lines 295b, 295c, and 295d to line 11 where they are summed and applied to preamplifier 20.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. Ultrasonic visualization head circuitry comprising:
   (a) a linear array of transducers, said array including n sub-arrays periodically arranged within said array such that for every transducer in each sub-array, the next transducer in that sub-array is the $n^{th}$ next transducer in said array;
   (b) n shift enable means for enabling a transducer in one of said sub-arrays, and for sequentially shifting the enabled transducer to the next transducer in said sub-array, each of said n shift enable means corresponding to each of said n sub-arrays;
   (c) mean shift means for sequentially activating shifts by said n shift enable means; said main shift means activating each of said shift enable means in a periodic fashion such that at any time the n transducers enabled by said shift enable means are adjacent; and
   (d) n pulse driver means for exciting enabled transducers in one of said sub-arrays; each of said pulse driver means corresponding to each of said sub-arrays.

2. Ultrasonic visulatization head circuitry comprising:
   (a) a linear array of transducers, said array including four sub-arrays periodically arranged such that for every transducer in each sub-array, the next transducer in that sub-array is the fourth next transducer in said array;
   (b) four shift enable means each for enabling a transducer in one of said sub-arrays, and for sequentially shifting the enabled transducer to the next transducer in that sub-array; said four shift enable means having an initial enable condition in which said four shift enable means enable the first four transducers in said array; and
   (c) main shift means for sequentially and periodically activating shifts by each of said four shift enable means, to cause the four enabled transducers to incrementally step along said array.

3. The ultrasound visualization head circuitry of claim 2 additionally comprising:
   (d) four pulse driver means, each for periodically exciting enabled transducers in one of said sub-arrays, said four pulse driver means corresponding to each of said four sub-arrays.

4. The ultrasound visualization head circuitry of claim 3 additionally comprising:
   (e) pulse delay decoder means, said means including means for detecting which of said shift enable means is shift activated by said main shift means, means for determining, in response to which shift enable means has been shift activated by said main shift means, to which of said four sub-arrays the middle two of the four enabled transducers belong, and means for delaying the excitation pulse to the two middle of the four enable transducers.

5. The ultrasound visualization head circuitry of claim 4 in which said delaying means includes means for delaying the excitation by the two pulse driver means which correspond to the two sub-arrays to which the middle two of the four enabled transducers belong.

6. The ultrasound visualization head circuitry of claim 5 in which each sub-array includes n transducers in parallel circuit with each other, each of said n transducers being isolated from the other transducers in the sub-array by a diode which is in series with that transducer and in parallel with the other transducers in the sub-array and in which each of said four pulse driver means includes (1) n switches, each of n switches being in parallel with one of the transducers in the sub-array to which the pulse driver means corresponds,
(2) means for applying a voltage differential to the sub-array,
(3) means for selectively discharging the voltage differential to one of the subarrays, said selective discharge means including means for closing the switch in parallel with that transducer, whereby that transducer is excited to generate an ultrasound signal,
(4) recharge means for reapplying the voltage differential to said excited transducer; and
(5) means for applying a constant current to the excited transducer through the diode corresponding to that excited transducer to maintain that diode in a forward biased state while the excited transducer receives echo signals.

* * * * *